J. A. EDEN, Jr.
MACHINE FOR MAKING STAYBOLTS AND THE LIKE.
APPLICATION FILED MAR. 12, 1919.
1,342,536.
Patented June 8, 1920.
5 SHEETS—SHEET 1.
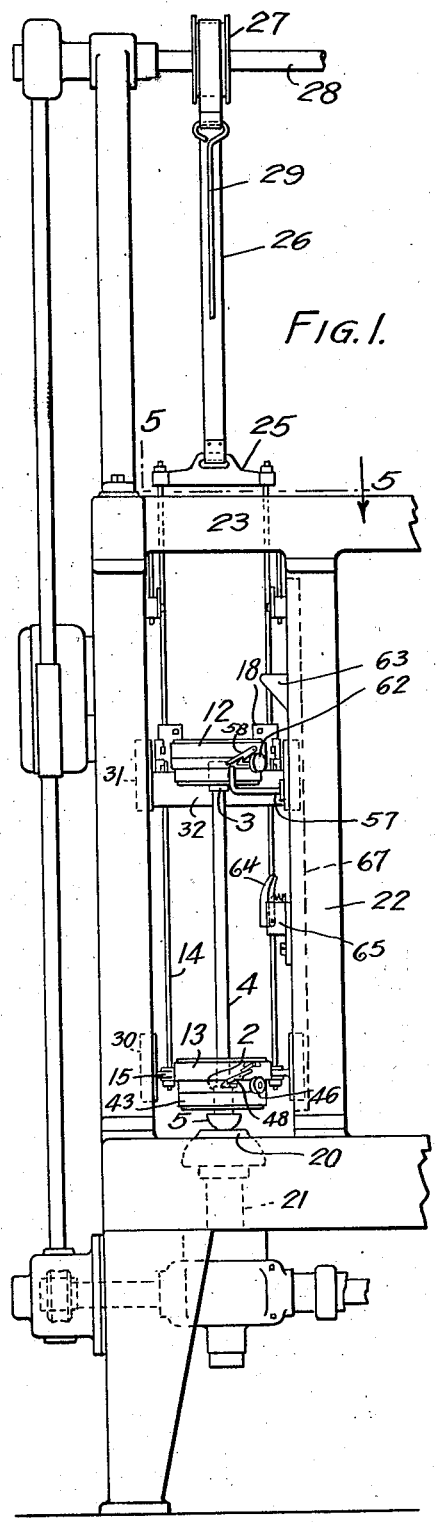
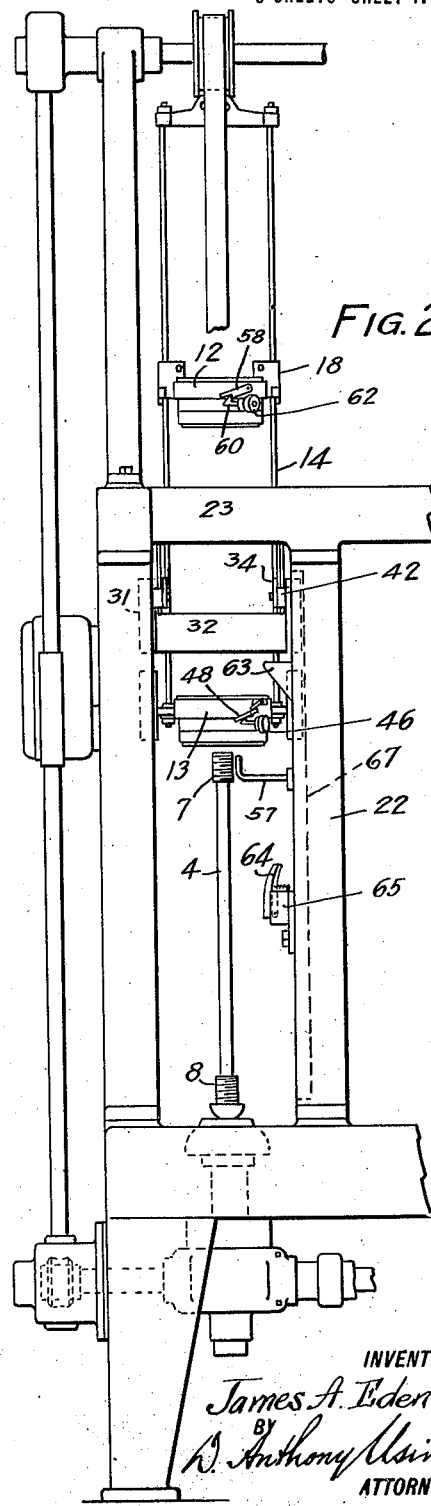
INVENTOR
James A. Eden, Jr.
BY
D. Anthony Usina,
ATTORNEY

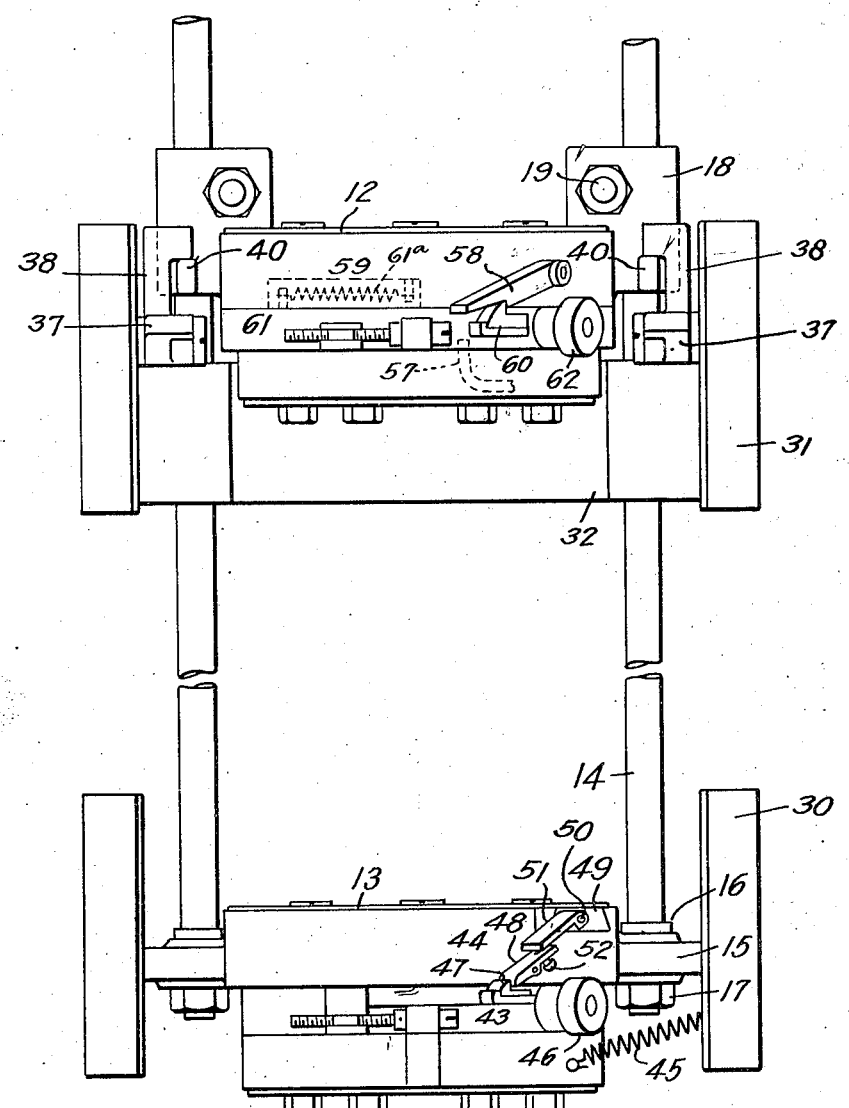

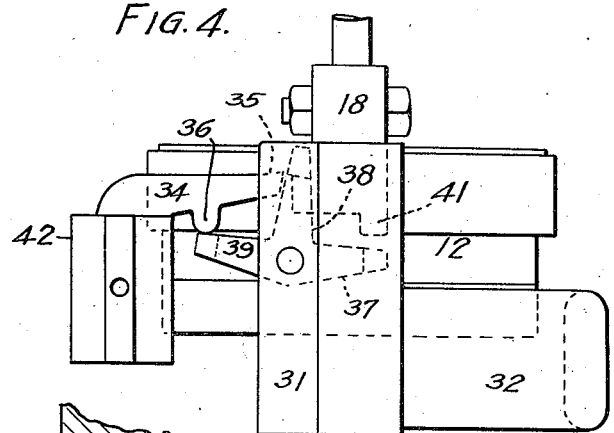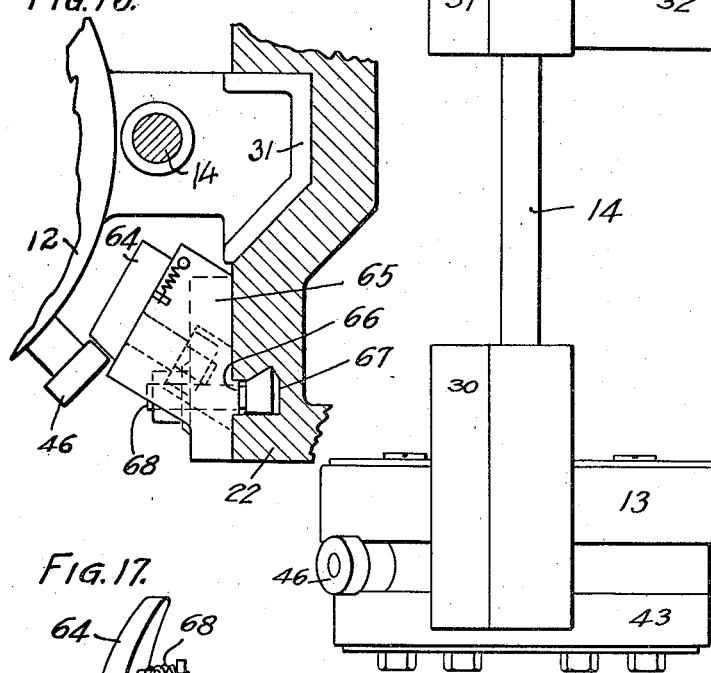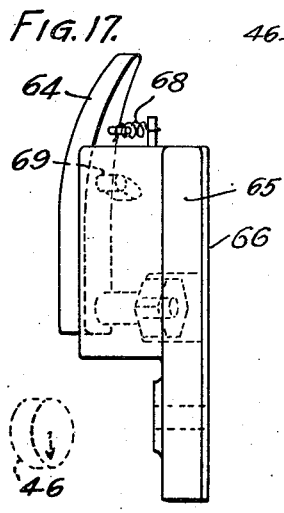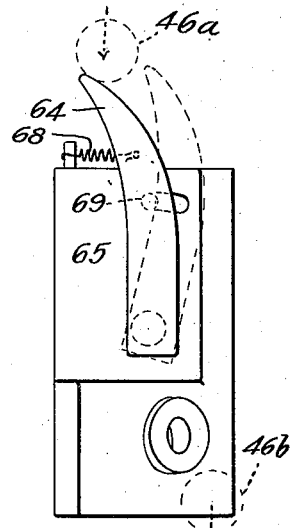

J. A. EDEN, Jr.
MACHINE FOR MAKING STAYBOLTS AND THE LIKE.
APPLICATION FILED MAR. 12, 1919.

1,342,536.

Patented June 8, 1920.

INVENTOR
James A. Eden, Jr.
BY
D. Anthony Usina, ATTORNEY

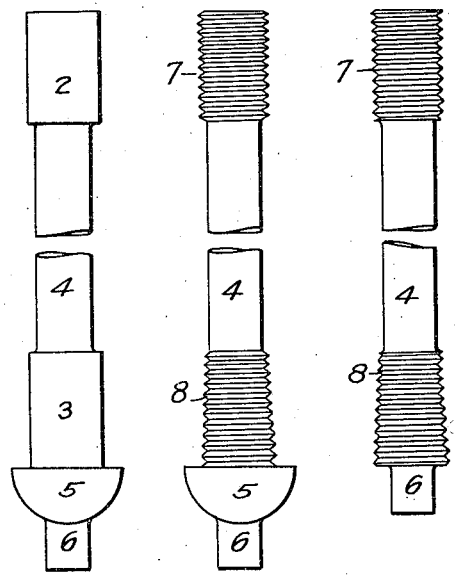
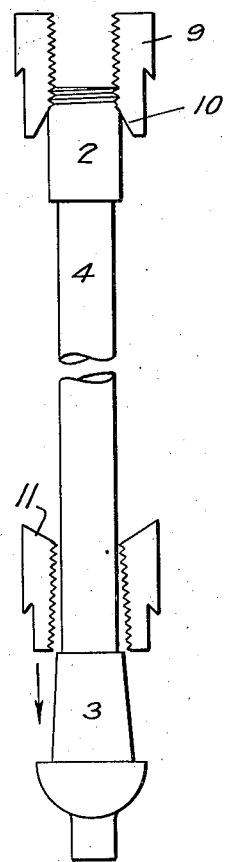
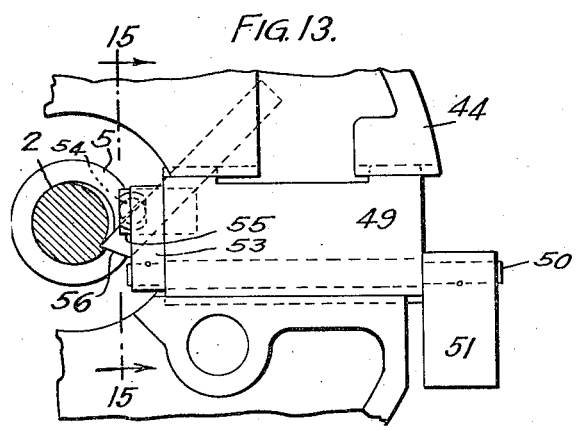
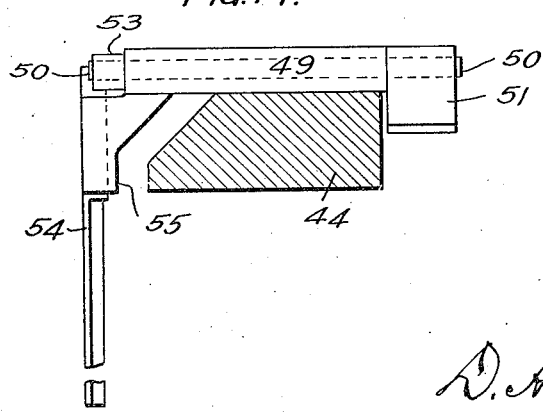
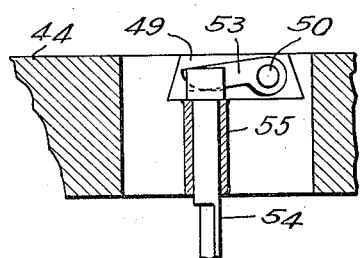

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

MACHINE FOR MAKING STAYBOLTS AND THE LIKE.

1,342,536.      Specification of Letters Patent.      Patented June 8, 1920.

Application filed March 12, 1919. Serial No. 282,247.

*To all whom it may concern:*

Be it known that I, JAMES A. EDEN, Jr., a citizen of the United States, residing in Springfield, Massachusetts, have invented certain new and useful Improvements in Machines for Making Staybolts and the like, of which the following is a specification.

The invention aims to provide a machine of simple construction and which shall be durable and accurate in operation and shall have certain other advantages referred to hereinafter.

The accompanying drawings illustrate a machine embodying the invention.

Figure 1 is a front elevation showing the position of the machine near the end of a staybolt threading operation;

Fig. 2 is a similar view showing the die-heads raised after the completion of the operation;

Fig. 3 is a front elevation of the die-heads and connected parts;

Fig. 4 is a side elevation of the same;

Fig. 9 is a diagram indicating the relation of the two die-heads to each other and to the blank;

Fig. 10 is an elevation of a blank to be threaded;

Fig. 11 is an elevation of a threaded bolt made from a similar blank;

Fig. 12 is an elevation of a bolt of slightly different style;

Fig. 13 is a plan of an automatic device for opening the lower die-head;

Fig. 14 is a side elevation of the same and Fig. 15 an end elevation thereof;

Fig. 16 is a plan and Figs. 17 and 18 are elevations of a controlling cam.

Figure 5:
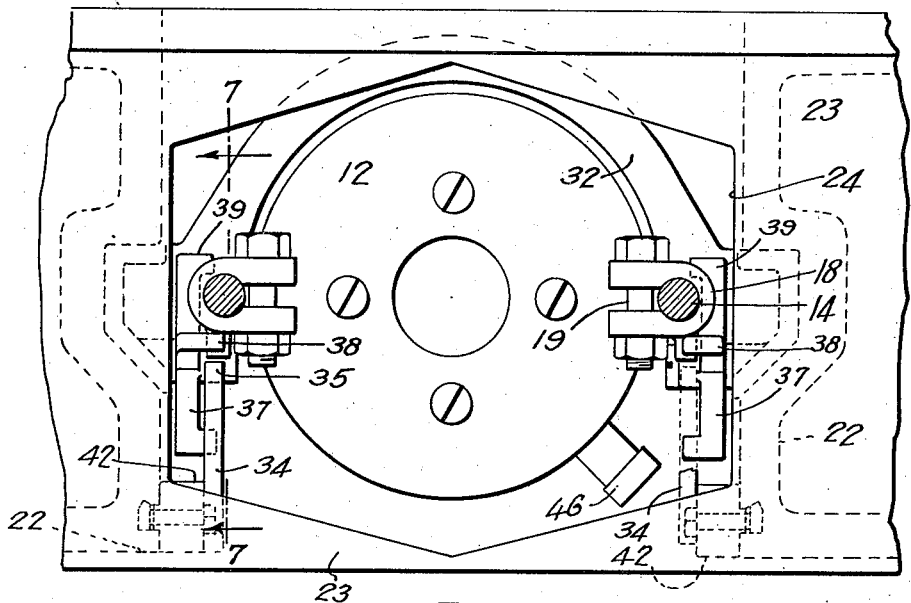
Fig. 5 is a section on the line 5—5 of Fig. 1.

Referring now to the embodiment of the invention illustrated, Fig. 10 shows a blank for the making of what are commonly called button-head staybolts. It is forged or turned to form enlarged portions 2 and 3 with an intermediate reduced shank 4, a button-head or shoulder 5 and a squared projection 6 by which it is rotated in turning or threading and also in applying it in a boiler. Fig. 11 shows a similar blank threaded with a cylindrical thread 7 on the upper portion and a conical thread 8 on the lower portion. Fig. 12 shows a bolt threaded in the same way but lacking the button-head, being of the sort styled "radial" staybolts. The present machine is particularly designed for threading bolts as in Figs. 11 and 12, and is shown in connection with a device useful only for button-head or similar shouldered bolts; but it may be used for various other classes of work and with or without the stop which coöperates with the button-head.

It comprises a pair of die-heads one for forming the upper thread and another for forming the lower thread. These are mounted in the machine and held at a fixed interval apart so that the upper die-head will cut a part of its thread before the lower one engages the blank and will thus (in combination with the part of the thread already formed) serve as a lead screw for the lower dies. As shown in Fig. 9 the upper chasers 9 are formed with a throat 10 so as to easily and properly center them on the blank. The lower chasers 11 are cut off squarely at their lower ends and cut a thread which constitutes an exact continuance of that cut by the upper die. The chasers 11 may be set at the angle indicated so as to cut a tapered or conical thread as in Fig. 11, or they may be set parallel with the axis of the blank to cut a cylindrical thread on the blank of Fig. 10 if desired. The rigid connection of the two die-heads and the detailed construction shown insures that the two threads shall be very accurately disposed with relation to each other and shall be of exactly the same pitch, which facilitates the screwing of the finished bolts into their plates.

The two die-heads indicated as a whole by the numerals 12 and 13 are connected to each other by rods 14. The lower head has side flanges 15 through which pass the lower ends of the rods and these are fixedly attached by means of collars 16 and nuts 17 (Fig. 3) on opposite sides of the flange. The upper head 12 is provided with flanges or wings 18 through which the rods 14 pass. These members 18 extend above the top of the die-head and are there split (Fig. 5) and provided with bolts 19 by which they can be clamped at any desired elevation fixedly on the rods 14. Thus the two heads are at a fixed interval apart (a multiple of the pitch of the threads to be cut) so that their threads will be in the proper relation to each other and so that they will operate at proper intervals on their parts of the blank as explained in connection with Fig. 9. The clamping members 18 provide a universal adjustment; that is, the separation of the heads can be adjusted to an infinitesimal variation and thus to an exact multiple of the pitch of the threads being cut.

The blank is mounted in a socket in the top of a block 20 on the upper end of a spindle 21 which is continuously rotated by any usual or suitable mechanism. The die-heads travel up and down between guides 22 which are connected by a cross-bar 23 above the operative position of the heads. The cross-bar 23 is provided, as shown in Fig. 5, with an opening 24 sufficient to allow the passage of the die-head 12 and the rods 14 and members 18 on the die-head. The upper ends of the rods 14 are connected by a cross-head 25 to a strap 26 which extends upward and over a pulley 27 on an overhead shaft 28 rotating continuously in a direction to pull the strap 26 up. The forward end of the strap carries a handle 29. The operator by pulling on the handle causes a frictional engagement of the strap with the pulley and thus lifts the die-heads after they have threaded a bolt. When a new bolt has been set in place the operator slackens the belt and allows the die-heads to come down to their starting position and then releases them so that they are fed by gravity and by the engagement of the upper die-head with the work in the manner of a lead screw.

Figure 6:
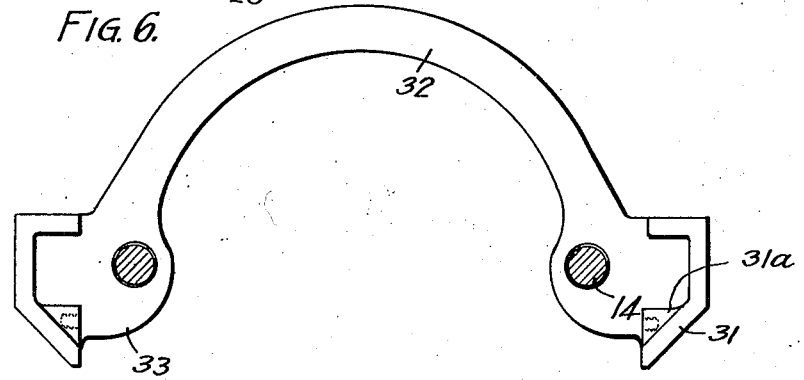
Fig. 6 is a plan of a slide which normally coöperates with the upper die-head.

The lower die-head is provided with elongated slides 30 of the usual type fitting in grooves in the guides 22 so as to guide the die-head accurately, these slides being fixed on the flanges 15 above referred to. But the upper die-head cannot be guided in the same way since it must pass above the cross-bar 23 and the latter overlies the guiding grooves in the guides 22. To permit this operation the upper die-head is provided with slides 31 which are detachably connected thereto, so that they will guide the head accurately during the actual cutting of the threads but will be disconnected from the die-head to permit the latter to pass without them up through the opening in the cross-bar. For greater rigidity and convenience in operation the guides 31 are connected together by a curved bar 32, Fig. 6, within which the die-head lies. The ends of the bar 32 are shaped to provide flanges 33 which extend under the die-head and through which the rods 14 pass freely. The location of the flanges 33 insures that the head cannot travel down without carrying the slides 31 before it, but it can travel upward without interference from said flanges. Means are also provided for supporting the slides 31 on the die-head up to a certain elevation, just below the cross-bar 23, and permitting the die-head to be disconnected from the slides and lifted higher; and for bringing the slides again into holding engagement with the die-head when the latter is lowered. The connecting means referred to also coöperates with certain devices on the guide frame to support the slides in their elevated position when they are disconnected from the head. This mechanism is illustrated best in Figs. 4, 5, 7 and 8.

On or near the upper end of each of the guides 22 is a projecting member 34 having a supporting end 35 and having on its underside a stop 36. On the inner face of a lug 31ª (Fig. 6) on each slide 31 is a pivoted supporting member having three arms 37, 38 and 39 having lateral projections on their inner ends. The clamping member 18 on the die-head has a projecting hook 40 which normally (Fig. 7) engages the projecting end of the arm 38 so that as the die-head is raised the slide 31 moves up with it. When the upward movement has continued until the end of the arm 37 strikes the stop 36 the three-armed lever swings from the position of Fig. 7 to that of Fig. 8 and drops so that the end of the arm 38 catches on the part 35 and supports the lever and the slide 31. The removal of the arm 38 from engagement with the hook 40 permits the head to continue its upward movement and the slides remain in position near the top of the guides 22.

Figure 7:
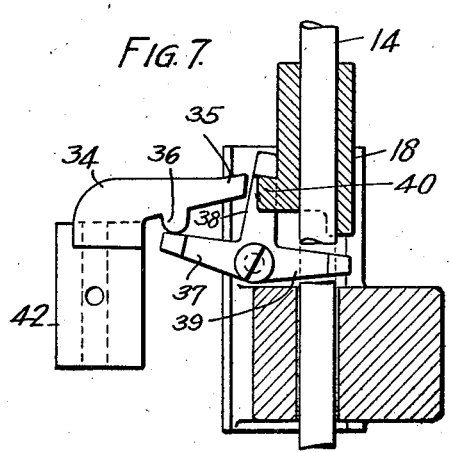
Fig. 7 is a section approximately on the line 7—7 of Fig. 5 with the parts in one position and Fig. 8 is a similar view with the parts in a second position.
Figure 8:
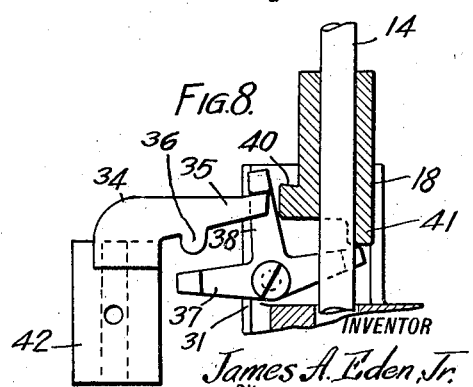

On the downward movement a projection 41 on the lower end of the member 18 strikes the arm 39 and swings the three-armed lever so as to bring the arm 38 over the hook 40, upon which it drops; thus restoring the parts to the position of Fig. 7 and holding the die-head in engagement with the slides during the further downward movement. During such movement the slides by their long engagement with the side guides direct the movement of the connecting rods 14 and of the die-head to which they are fastened accurately in a straight line.

The member 34 is preferably in the form of a separate bracket projecting from a block 42 adapted to be fastened on the upper part of a post 22 as indicated in Figs. 1 and 2 and adjustable thereon to any desired height.

The frame of the machine carries the usual cam just above the level of the blank to close the dies when they are lifted to this point, and the usual stop which releases the upper die-head and allows it to turn and open the dies after it has threaded its portion of the blank The lower die may be similarly opened at the end of its threading, but for button heads and similar shouldered bolts I prefer to use a trip which is automatically operated by the completion of the thread to a determined point on the blank rather than to a determined absolute elevation. It is important to cut the thread close up to the head. It is important also to avoid cutting into the head with the die, which is liable to injure it. At the same time it is to be considered that blanks are usually very roughly formed and there are substantial variations in the height of the face of the button head, so that it is impossible to stop the thread at an exact elevation without making it sometimes too short and sometimes penetrating the head.

The die is of a common construction in which the lower part 43 (Fig. 3) turns in the fixed ring 44 under the action of springs 45 and carries a roller 46 which at the beginning of its downward movement (as hereinafter described with reference to Figs. 16, 17 and 18) strikes a cam 64 and throws the ring 43 around against the pull of its springs until a stop 47 on the ring 43 is caught by a pawl 48 on the fixed part 44. In previous constructions the pawl 48 has been arranged to strike a fixed stop at the desired limit of downward movement of the die-head and thus to release the ring 43 and allow its springs to turn it and open the dies. I purpose to withdraw this pawl, or any similar locking device, by mechanism which is automatically actuated by the face of the head on the blank so that the termination of the thread will be regulated by the height of the head of the blank.

The fixed part 44 of the die-head is grooved to receive a bearing block 49 (Fig. 13) through which extends a shaft 50 carrying on its outer end an arm 51 arranged to strike the end of an adjustable screw 52 carried by the pawl 48 so as to lift the latter and release the ring 43. On its inner end the shaft 50 carries an arm 53 resting on the top of a rod 54 which is guided in a bearing block 55 depending from the inner end of the block 49. The rod 54 is shaped so as to pass through the central opening in the die-head close to one of the cutters or chasers 56 and to the enlarged lower portion 3 of the blank. As the die-head moves downward the rod 54 will approach the head 5 of the blank, and when it strikes this head and is lifted a slight distance it will withdraw the pawl and release the head and allow it to open and terminate the thread. The rod 54 has an enlarged head to prevent its dropping through the bearing 55. The adjustment of the screw 52 determines the exact relation between the movement of the rod 54 and the actual tripping of the pawl; that is to say it determines how soon after the rod strikes the head of the blank the dies shall open. This automatic, blank-controlled, die opening device will be found useful also in threading and turning heads of various other designs than that herein illustrated.

The entire blank controlled mechanism may be removed by first lifting out the rod 54, removing the arm 51 and then sliding the block 49 inward until it clears the recess in the ring 44. Its removal does not affect any of the remaining parts since in use it was not connected to any of them. In machines which do not use it the ordinary devices for unlatching and causing the opening of the dies at a determined point in their elevation can be substituted, operating on the same pawl 48. A similar mechanism is shown and more broadly claimed in my application No. 220,719.

Assuming that the blank controlled trip is to be used for the lower die-head, I have shown on Figs. 1 and 2 the location of the additional trips and cams which are to be used, and in Figs. 16, 17 and 18 the details of one of the cams.

I propose that the upper die-head shall open slightly before the lower one since the latter part of its movement is used only for determining the lead of the lower one. It is opened by means of a trip 57, shown in dotted lines in Fig. 3, which is in line with the extended end of a pawl 58 on the upper part 59 of the die-head and engaging the stop 60 on the lower part 61 of said head. There are springs indicated in dotted lines at 61ª, of a known style and arrangement, within the die-head to turn the lower part 61 to the right in Fig. 3 with relation to the fixed part 59, when the pawl 58 is withdrawn. Therefore when the trip 57 is struck by the pawl the lower part 61 of the die-head turns and this opens the die.

This lower member carries also a cam roller 62 by which the head is to be closed later. As shown in Figs. 1 and 2 there is a cam 63 in position to engage the roller 62 as the latter passes upward above the top of the blank and to throw the lower part of the die-head around until the stop thereon is engaged by the pawl so as to hold the die closed. This upper die then remains closed until it descends on the next blank and cuts a thread thereon.

The lower die-head 13 shall not be closed on the up stroke (which would prevent its passing the top of the blank) and I arrange a cam which shall let the head pass upward without effect and shall close it on the down stroke just before it reaches the enlargement on the lower end of the blank. Such a cam is shown in Figs. 16, 17 and 18. In these figures I have shown the method of mounting the cam and also mounting the upper cam 63 and the trip 57 so that these several parts may be set in different positions vertically adjusted according to the design of the staybolt to be formed; this mount being similar to that adopted for the arms which determine the separation of the slides from the upper die-head to permit the latter to pass through the cross-bar of the machine.

The cam 64 is pivotally mounted on the inclined face of a block 65 on the rear face of which is a rib 66 guided in an undercut slot 67 in the face of the guiding post 22. A bolt 68 has a head shaped to fit in the slot, the body of the bolt passing through the block 65 and the projecting end being fastened by a nut. The cam 64 is pulled backward by a spring 68 and its movement is limited by a pin 69 working in a slot in the supporting block. The roller 46 on the lower die-head moves upward along the vertical line through the position indicated at 46$^a$ in Fig. 18, pushing the cam out of its way as it passes upward. On the way down it strikes the upper end of the cam and is shifted over to the left (Fig. 16) sufficiently to cause the die to close and to be caught by its pawl, the roller then passing down in the line indicated by the positions 46$^b$, Fig. 18. Each of the cams, as well as the trip 57 and the block 42 previously referred to is mounted on a block similarly guided and fastened in the vertical undercut groove 67 which extends throughout the greater part of the height of one of the guide posts 22, as indicated in dotted lines in Figs. 1 and 2.

Though I have described with great particularity of detail certain specific embodiments of my invention, yet it is not to be understood therefrom that the invention is restricted to the embodiments illustrated. Various modifications in the separate parts and in their arrangements may be made by those skilled in the art without departing from the invention as defined in the following claims.

What I claim is—

1. A staybolt machine comprising a pair of die-heads held at a fixed interval apart, one of said die-heads arranged to cut a part of its thread on one part of a blank before the other die-head engages the other part of the blank.

2. A staybolt machine comprising a pair of die-heads held at a fixed interval apart, one of said die-heads arranged to cut a part of its thread on one part of a blank before the other die-head engages the other part of the blank, the first die-head having chasers formed with a throat and the second being without such a throat and arranged to cut a thread which constitutes a continuation of that cut by the first die-head.

3. A staybolt machine comprising a pair of die-heads, side guides connected by a cross-bar above the operative position of the die-heads, slides for said die-heads working in said guides and means for freeing the upper die-head from its slides and lifting it above the cross-bar.

4. A staybolt machine comprising a pair of die-heads, side guides, slides for the die-heads working in said guides and mechanism for supporting the slides of the upper die-head up to a certain elevation and permitting said die-head to be lifted higher without disturbing its relation to the lower die-head.

5. A staybolt machine comprising a pair of die-heads held at a fixed interval apart, side guides, slides for the die-heads working in said guides, and mechanism for supporting the slides of the upper die-head up to a certain elevation and permitting said die-head to be lifted higher and for bringing said slides into engagement again with said die-head when it is lowered and withdrawing the support.

6. A staybolt machine comprising a die-head, guides, slides for the die-head working in said guides, a supporting device on said guides, a supporting device on the die-head and means for transferring the slides for the die-head to the supporting device on said guides on an upward movement of said die-head and for transferring the support of the same slides from said guides to said die-head on a downward movement of the latter.

7. A staybolt machine comprising a pair of die-heads for threading different parts of a blank, means for opening one of said die-heads at a predetermined elevation and means for opening the other at an elevation determined by the location of a shoulder on the blank.

8. A staybolt machine comprising a pair of die-heads the first arranged to cut a part of its thread on one part of the blank before the second engages another part of the blank and means for opening the first die-head before opening the second.

9. A staybolt machine comprising a pair of die-heads adapted to be opened at the end of their forward stroke, means for closing one of said die-heads on the reverse stroke and for closing the other on the advance stroke before it engages the blank.

10. A staybolt machine comprising a pair of die-heads, vertical guides in which said die-heads reciprocate, a rotary spindle supporting the lower end of a blank and rotating the same, said die-heads being held at a fixed interval apart and adapted to be lowered into engagement with and to thread different parts of a blank as they travel downward.

In witness whereof I have hereunto signed my name.

JAMES A. EDEN, JR.